United States Patent Office 3,395,180
Patented July 30, 1968

3,395,180
SELECTIVE PREPARATION OF 1,1,2,2-TETRA-CHLOROETHYLSULFENYL CHLORIDE IN THE REACTION OF TRICHLOROETHYLENE AND SULFUR DICHLORIDE
Gustave K. Kohn, Berkeley, Calif., assignor to Chevron Research Company, San Francisco, Calif., a corporation of Delaware
No Drawing. Filed Aug. 30, 1965, Ser. No. 483,852
10 Claims. (Cl. 260—543)

ABSTRACT OF THE DISCLOSURE

Process for selectively preparing 1,1,2,2-tetrachloroethylsulfenyl chloride by reacting trichloroethylene with sulfur dichloride at about 50 to 200° C. in the presence of a small amount of trialkyl phosphate, dialkylphosphorochlorodate, secondary alkyl amine or tertiary alkyl amine.

---

This application concerns a process for selectively preparing 1,1,2,2-tetrachloroethylsulfenyl chloride. More particularly, it is directed to the preparation of 1,1,2,2-tetrachloroethylsulfenyl chloride by the direct addition of sulfur dichloride to trichloroethylene.

It is well known that sulfur dichloride will react with olefins and halogenated olefins to form a wide variety of sulfur-containing compounds, including sulfides and sulfenyl chlorides. For instance, sulfur dichloride has been reacted with ethylene to form mustard gas, $$(ClCH_2CH_2)_2S$$

and with fluorinated olefins at elevated temperatures and high pressures (2000 p.s.i.) or, alternatively, at temperatures below 45° C. in the presence of ultraviolet light to form mixtures of sulfenyl halides and sulfides.

In all of these previous reactions, and especially in those involving halogenated olefins, the product tends to be a mixture of sulfides, sulfenyl chlorides and halogenated alkanes. At best, these previous methods, as regards production of sulfenyl chlorides, give only about 40% conversion and low yields coincident with the formation of relatively large amounts of byproducts.

It has now been found that 1,1,2,2-tetrachloroethylsulfenyl chloride may be formed by the rapid addition of $SCl_2$ to trichloroethylene with conversions up to about 80% and yields above 90%.

The specific sulfenyl halide to which this application is directed, 1,1,2,2-tetrachloroethylsulfenyl chloride, is of prime value as a starting material in the production of biologically-active compounds. Previous methods for preparing it have involved circuitous reaction schemes or have suffered from low conversions, i.e., less than 50%, and the production of large amounts of pentachloroethane.

Particularly, the process of this invention comprises reacting trichloroethylene with sulfur dichloride at atmospheric pressure and at a temperature of from about 50–200° C. in the presence of a compound selected from the group consisting of aliphatic saturated secondary and tertiary amines, nuclear heterocyclic amines, tri(lower)alkyl phosphates and di(lower)alkyl phosphorochloridates.

In accordance with the invention, the selective addition of sulfur dichloride to trichloroethylene takes place in the presence of a saturated aliphatic secondary or tertiary amine, a nuclear heterocyclic amine, a tri(lower)alkyl phosphate or a di(lower)alkyl phosphorochloridate. The presence of these compounds has a profound effect in promoting or directing the production of 1,1,2,2-tetrachloroethylsulfenyl chloride and, correlatively, eliminating byproducts. These promoters may be present in amounts ranging from as low as 20 parts per million to 5% of the reaction mixture. More usually, they will be present in quantities from 0.01 to 0.2 weight percent of the reaction mixture.

The secondary and tertiary amines of this invention include saturated aliphatic and both nuclear saturated and nuclear aromatic heterocyclic amines. The aliphatic amines of this invention are those wherein 2–3 of the hydrogens of the parent compound, ammonia, have been substituted with saturated aliphatic groups. These amines are definitive of the structure

wherein $R^1$ is hydrogen or a saturated aliphatic group of from 1 to 12 carbons, preferably alkyl and more preferably lower alkyl, e.g., methyl-hexyl, $R^2$ and $R^3$ are saturated aliphatic groups of from 1 to 12 carbons, preferably alkyl and more preferably lower alkyl and, where $R^1$ is hydrogen, $R^2$ and $R^3$ may be polyalkylene polyamine groups of from 1 to 12 carbons.

Illustrative of the saturated aliphatic secondary and tertiary amines which are presented by the above formula are: dimethylamine, methylethylamine, diethylamine, methyl-i-propylamine, ethyl-n-propylamine, ethylbutylamine, methyl-s-butylamine, dipropylamine, di-i-propylamine, ethylamylamine, methylhexylamine, propylbutylamine, butylamylamine, dibutylamine, diamylamine, butylhexylamine, amylhexylamine, dihexylamine, methyldodecylamine, didodecylamine, pentaethylenetetramine, diethylenetriamine, tetraethylenepentamine, triethylamine, tributylamine, trihexylamine, trioctylamine, methyldiethylamine, methylethyl-i-propylamine, octylnonyldecylamine, etc.

Nuclear heterocyclic amines employed in this invention may have nuclear aromatic unsaturation or be saturated. Nuclear heterocyclic amines are those in which nitrogen is involved in the ring structure. These heterocyclic amines have a single nitrogen atom and from 4 to 8 carbons, 4–5 of these being involved in the ring nucleus. Except for the heteroatom, these amines are hydrocarbyl. When aromatic unsaturation is present there will be 5 carbons in the ring with the nitrogen. Illustrative of the heterocyclic amines included within this invention are pyridine, piperidene, pyrrolidene, the picolines, the lutidines and the collidines.

The tri(lower)alkyl phosphates of this invention are of the formula:

wherein $R^4$ is alkyl or haloalkyl of from 1 to 12 carbons, and the halogen of the haloalkyl group is of atomic number 17 to 35, i.e., chlorine or bromine. Preferably, $R^4$ is alkyl of from 2 to 4 carbons. Among those phosphates represented by this formula are trimethylphosphate, tri-(chloromethyl)phosphate, triethylphosphate, tri-(bromoethyl)phosphate, tri-(chloroethyl)phosphate, tributylphosphate, triamylphosphate, tri-2-ethylhexylphosphate, trioctylphosphate, tridodecylphosphate, etc.

Similarly, the di(lower)alkyl phosphorochloridates of the invention are definitive of the formula

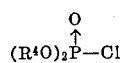

wherein $R^4$ is as previously defined. Examples of phosphorochlorides falling within this formula are dimethylphosphorochloridate, di-chloroethylphosphorochloridate, diethylphosphorochloridate, dipropylphosphorochloridate, di-chlorobutylphosphorochloridate, dibutylphosphorochloridate, diethylphosphorochloridate, etc.

In this unique process the mol ratio of $SCl_2$ to trichloroethylene will be between 1:0.1–10, preferably in the range of 1:1–5. Mol ratios approximating 1:1 are particularly preferred.

The process of this invention is normally carried out at atmospheric pressure or autogenous pressures up to about 100 p.s.i. and at temperatures above about 50° C. and below about 200° C. More usually, the temperature will be in the range of 100–150° C. An inert diluent may be used in the process; however, it is convenient to carry out the reaction neat, that is, with only the reactants and the promoter. Under these conditions, conversions of about 80% and yields of approximately 90% are achieved within about 0.5–24 hours, usually within 2 hours.

This unique process is adaptable to either batch or continuous operation. In order to increase the conversion over that of the first pass, the product may be separated from the unreacted reactants and the latter may be recycled.

At the end of the reaction, the reactants are conveniently separated from the product by distillation. Further purification of the product may be effected by fractional distillation, chromatography and other known methods if desired.

The following examples illustrate the process of this invention and the increase in yield and conversions achieved by it. These examples are offered by way of illustration only and are in nowise limiting to the invention as described herein.

Example 1

Into Pyrex tubes were put 2 mols of trichloroethylene, 1 mol of sulfur dichloride and di-isopropylamine promoter in the indicated amounts based on the trichloroethylene. Each tube was then sealed and heated to a temperature of 110–112° C. The tubes were removed after 2 hours and analyzed by gas liquid chromatography. In all cases, the characteristic red color of the $SCl_2$ had disappeared rapidly, indicating the reaction to be complete after a short period. The following table gives the gas liquid chromatography analysis for 1,1,2,2-tetrachloroethylsulfenyl chloride (TES) and pentachloroethane (PCE) expressed as the ratio of TES:PCE as determined by the relative peak heights.

| Promoter, p.p.m. | Approx. Ratio, TES:PCE | |
|---|---|---|
| | 1 hr. | 2 hrs. |
| 0 | 1:10 | 1:10 |
| 50 | 3.0:1 | 4.3:1 |
| 100 | 6.9:1 | 6.7:1 |
| 500 | 5.6:1 | 5.6:1 |

These comparative tests show that the presence of as little as 50 p.p.m. of the promoters of this invention nearly reverse the preference in the reactions between sulfur dichloride and trichloroethylene. Without promoter the product is almost exclusively pentachloroethane; whereas, with promoter it is largely tetrachloroethylsulfenyl chloride.

Example 2

A 1 mol-portion of sulfur dichloride containing 500 p.p.m. tributylphosphate and a 2 mol-portion of trichloroethylene were put into each of 4 Pyrex tubes. The tubes were sealed and heated to 110° C. with removal after ½, 1 and 2 hours for gas liquid chromatography analysis of the contents. The following table gives the average results of these analyses expressed as the ratio of 1,1,2,2-tetrachloroethylsulfenyl chloride (TES) to pentachloroethane (PCE) as determined by the relative peak heights.

| Time: | Ratio, TES:PCE |
|---|---|
| ½ | 5.6:1 |
| 1 | 6.9:1 |
| 2 | 8.1:1 |

Example 3

A 1 mol-portion of sulfur dichloride containing 0.1% diethylphosphorochloridate and a 1 mol-portion of trichloroethylene containing 100 p.p.m. of di-isopropylamine were put into each of 4 Pyrex tubes. The tubes were sealed and heated at 115° C. for 8 hours, after which the contents were analyzed by gas liquid chromatography. The average conversion to TES based upon trichloroethylene was 79% and the yield was 97%. The proportion TES:PCE was 31:1.

Example 4

A 1 mol-portion of sulfur dichloride and a 2 mol-portion of trichloroethylene containing 200 p.p.m. of a promoter containing 85–90 weight percent triethylamine were put into each of 4 Pyrex tubes. The tubes were sealed and heated to 110–114° C. for 2 hours, after which the contents of each were analyzed by gas liquid chromatography. The relative proportion TES:PCE based on peak heights was 5.75:1.

Example 5

A charge of 1150 pounds of $SCl_2$ to which was added 3 pounds of triethylphosphate was added to a glass-lined Pfaudler vessel containing 1320 pounds of trichloroethylene to which was added 163 gms. of di-isopropylamine. The vessel was heated to 120–140° C. and after a few hours the reaction was completed. The contents of the vessel were analyzed and found to comprise the following:

| Composition: | Weight Percent |
|---|---|
| Unreacted $SCl_2$ | 9.3 |
| Unreacted TCE | 11.7 |
| $S_2Cl_2$ | 2.9 |
| PCE | 6.8 |
| TES | 69.3 |

Yield was calculated to be 87%.

As will be evident to those skilled in the art, various modifications on this process can be made or followed, in the light of the foregoing disclosure and discussion, without departing from the spirit or scope of the disclosure or from the scope of the following claims.

What is claimed is:

1. A process for selectively preparing 1,1,2,2-tetrachloroethylsulfenyl chloride consisting essentially of reacting trichloroethylene with sulfur dichloride at a temperature from about 50–200° C. in the presence of compounds selected from the group consisting of trialkylphosphates in which the alkyl groups individually contain 1 to about 12 carbon atoms, dialkylphosphorochloridates in which the alkyl groups individually contain 1 to about 12 carbon atoms, and secondary and tertiary alkyl amines in which the alkyl groups individually contain 1 to about 12 carbon atoms.

2. The process of claim 1 wherein the trialkylphosphates, dialkylphosphorochloridates, or secondary and tertiary alkyl amines are present in an amount ranging from about 0.01 to 0.2 weight percent of the reaction mixture.

3. A process for selectively preparing 1,1,2,2-tetrachloroethylsulfenyl chloride consisting essentially of reacting trichloroethylene with sulfur dichloride at a temperature from about 50–200° C. in the presence of a trialkylphosphate in which the alkyl groups individually contain 1 to about 12 carbon atoms.

4. The process of claim 3 wherein the alkyl groups of said trialkylphosphate individually have from 2 to 4 carbons.

5. A process for selectively preparing 1,1,2,2-tetrachloroethylsulfenyl chloride consisting essentially of reacting trichloroethylene with sulfur dichloride at a temperature from about 50–200° C. in the presence of a dialkylphosphorochloridate in which the alkyl groups individually contain 1 to about 12 carbon atoms.

6. The process of claim 5 wherein the alkyl groups of said dialkylphosphorochloridate are individually of from 2 to 4 carbons.

7. A process for selectively preparing 1,1,2,2-tetrachloroethylsulfenyl chloride consisting essentially of reacting trichloroethylene with sulfur dichloride at a temperature from about 50–200° C. in the presence of a secondary alkyl amine in which the alkyl groups individually contain 1 to about 12 carbon atoms.

8. A process for selectively preparing 1,1,2,2-tetrachloroethylsulfenyl chloride consisting essentially of reacting trichloroethylene with sulfur dichloride at a temperature from about 50–200° C. in the presence of a tertiary alkyl amine in which the alkyl groups individually contain 1 to about 12 carbon atoms.

9. The process of claim 8 wherein said tertiary alkyl amine is triethylamine.

10. A process for selectively preparing 1,1,2,2-tetrachloroethylsulfenyl chloride consisting essentially of reacting trichloroethylene with sulfur dichloride in a mol ratio of sulfur dichloride to trichloroethylene of from 1:0.1 to 1:10 at a temperature of from 100–150° C. for at least 0.5 hour and in the presence of from 0.01–0.2 weight percent compounds selected from the group consisting of trialkylphosphates wherein the alkyl groups are individually from 2 to 4 carbons, dialkylphosphorochloridates wherein the alkyl groups are individually of from 2 to 4 carbons, secondary alkyl amines of from 2 to 12 carbons and tertiary alkyl amines of from 3 to 18 carbons.

References Cited
UNITED STATES PATENTS

| | | | |
|---|---|---|---|
| 3,144,482 | 8/1964 | Flay | 260—543 |
| 3,144,483 | 8/1964 | Flay | 260—543 |

LORRAINE A. WEINBERGER, *Primary Examiner.*

H. C. WEGNER, *Assistant Examiner.*